United States Patent [19]
Lönnqvist

[11] Patent Number: 5,880,836
[45] Date of Patent: Mar. 9, 1999

[54] APPARATUS AND METHOD FOR MEASURING VISIBILITY AND PRESENT WEATHER

[75] Inventor: Jan Lönnqvist, Espoo, Finland

[73] Assignee: Vaisala Oy, Helsinki, Finland

[21] Appl. No.: 736,282

[22] Filed: Oct. 24, 1996

Related U.S. Application Data

[63] Continuation of Ser. No. 370,723, Jan. 10, 1995, abandoned.

[30] Foreign Application Priority Data

Jan. 11, 1994 [FI] Finland ................................. 940117

[51] Int. Cl.$^6$ ................................................. G01N 15/02
[52] U.S. Cl. .......................... 356/336; 356/338; 356/342; 250/574; 702/3
[58] Field of Search .......................... 250/559.29, 559.38, 250/573; 364/420; 702/3

[56] References Cited

U.S. PATENT DOCUMENTS

| | | | |
|---|---|---|---|
| 3,906,389 | 9/1975 | Matsumoto et al. ................. | 330/59 |
| 4,289,397 | 9/1981 | Itzkan et al. . | |
| 4,502,782 | 3/1985 | Werner et al. . | |
| 4,605,302 | 8/1986 | Lofgren et al. . | |
| 4,613,938 | 9/1986 | Hansen et al. ....................... | 356/338 X |
| 4,937,461 | 6/1990 | Traina ..................................... | 356/438 |
| 5,116,124 | 5/1992 | Huttman ................................. | 356/342 |
| 5,206,698 | 4/1993 | Werner et al. . | |
| 5,352,901 | 10/1994 | Poorman ............................... | 250/574 |
| 5,373,367 | 12/1994 | DeGunther et al. ................. | 356/435 |
| 5,444,530 | 8/1995 | Wang ..................................... | 356/338 |
| 5,504,577 | 4/1996 | Lonnqvist et al. ................... | 356/5.06 |

FOREIGN PATENT DOCUMENTS

| | | |
|---|---|---|
| 4204165 | 3/1993 | Germany . |
| 451771 | 10/1987 | Sweden . |
| 460156B | 9/1989 | Sweden . |

Primary Examiner—K. P. Hantis

[57] ABSTRACT

The invention relates to an apparatus and method for measuring visibility and present weather. The apparatus includes a light source (1) for directing a light ray toward the object (9) to be measured, a detector (3) for measurement of light which is forward scattered from the object (9), and computing elements (12–15) adapted to differentiate the signal representing the forward scattered light from signals representing stray or ambient light. The apparatus may include a pulsed light source, a receiver (19) for receiving directly backward reflected/scattered light pulses, and computing elements (11) for computing the propagation delays of the different backward reflected components in the received pulse-shaped optical signal.

20 Claims, 4 Drawing Sheets

APPARATUS AND METHOD FOR MEASURING VISIBILITY AND PRESENT WEATHER

This application is a continuation, of application Ser. No. 08/370,723 filed on Jan. 10, 1995, which is incorporated herein by reference, now abandoned.

The present invention relates to an apparatus for the measurement of visibility and present weather.

The invention also concerns a method of measuring visibility and present weather.

Vertical visibility and cloud base height, also called ceiling, are measured using an apparatus acting as a lidar-type optical sounder with, however, separate optics for the light paths of the transmitter and receiver sections. The transmitter section of the apparatus launches short-duration laser pulses, the receiver section detects and amplifies the reflected and backscattered optical signals related to atmospheric elements such as fog and rain, etc. (i.e., backward directed optical signals) and the information processing section digitizes the analog output signal of the receiver into a form suited for recording the reflections invoked by the short-duration laser pulse along the entire length of the measured light-ray path, whose measurement range may be defined as 0.2–4 km for instance, into the memory of a computer as a reflection/backscatter profile from which a cloud with its base height can be identified by means of conventional computing algorithms and vertical visibility can be computed for, e.g., fog and snow situations. The algorithms and computations are chiefly based on the shape of the reflection profile, rather than the absolute intensity of the received signals. In such conventional equipment, the measurement range starts only from a certain distance at which the transmitter and receiver beams are sufficiently overlapping, whereby said minimum distance is, e.g., 0.2 km according to the measurement range cited above.

The ceilometer with the improved construction according to the present invention incorporates an optical system in which the transmitter and receiver beams are super-imposed. A mere superimposition of the beams causes a short-range saturation effect which will be closer discussed later in the text in conjunction with the description of FIG. 3. Using an optical feedback arrangement, the measurement range can be extended to start immediately from in front of the optics of the apparatus. Then such an apparatus with optical feedback may typically provide a measurement range of, e.g., 0–4 km. However, such equipment is incapable of identifying different types of rain.

Horizontal visibility is measured from the scatter of light. In a prior-art embodiment (the so-called Backscatter Measurement System), the scatter and reflection of light are measured in an essentially backward direction to the launched ray by means of an apparatus resembling the above-described ceilometer differing therefrom, however, in that the receiver only detects the total backscatter/reflection and is not capable of differentiating the components reflected back to the receiver at different distances from each other in same fashion as performed by the above-described ceilometer. A well-known problem of this visibility meter type is that if the apparatus is calibrated for accurate visibility readings in fog, it indicates incorrectly long visibility readings in rain and incorrectly short visibility readings during snowing.

In another visibility meter embodiment (the so-called Forward Scatter Meter) based on optical scatter, the receiver beam is adapted to intersect the transmitter beam at a 20°–45° angle with reference to the propagation direction of the transmitter ray. A known problem of such an arrangement is that if the meter is calibrated for accurate visibility readings in fog, it indicates incorrectly short visibility reading in rain and incorrectly long visibility readings during snowing. Even this embodiment is based on measuring the backscatter intensity only, and no information is obtained on the time-related profile of the received optical signal resulting from the backscatter of the transmitted light. Typical optical transmit power level in such a measurement system is in the order of 5 mW continuous output power.

One of the major unsolved problems in the measurement of weather data and automation thereof is the automatic measurement of local weather (called Present Weather in meteorological terminology). This meteorological entity includes as one of its major subgroups the detection of rain combined with the identification of rain type and intensity (on a scale slight/moderate/heavy).

Another subtask related to the automatic identification of rain types is the differentiation of light, wind-driven snow (Blowing Snow in meteorological terminology) from snow precipitation, that is, falling snow. This difference is particularly important for the estimation of the water resources balance and spring floods. This problem has remained awaiting a viable solution.

Disturbing to aviation in particular is the occurrence of ground fog associated with the frosting of ground surface during zero-wind weather, whereby locally measuring apparatuses may occasionally report extremely pessimistic visibility readings.

It is an object of the present invention to overcome the shortcomings of the above-described techniques and to achieve an entirely novel apparatus and method for the measurement of visibility and present weather.

The goal of the invention is attained by combining the above-described type of improved ceilometer and a forward-scatter measuring apparatus in such a manner that the pulsed laser beam of the ceilometer is used as the light source of the scatter measurement apparatus and the additional information on the rain type is acquired from the backscatter vs. time profile of the laser light scatter signal detected by the receiver.

The invention offers significant benefits.

The embodiment according to the present invention achieves a construction of improved cost-efficiency, lighter weight and more compact size than achievable by a combination of partial embodiments of conventional techniques. In addition to visibility measurement, such an integrated apparatus is capable of reliably detecting rain, its type and its intensity. Also blowing snow can be differentiated from falling snow with the help of the apparatus.

In the following the invention will be examined in greater detail with the help of the exemplifying embodiments illustrated in the appended drawings in which FIG. 1 is a schematic block diagram of an embodiment of the apparatus according to the invention;

Figure 1:
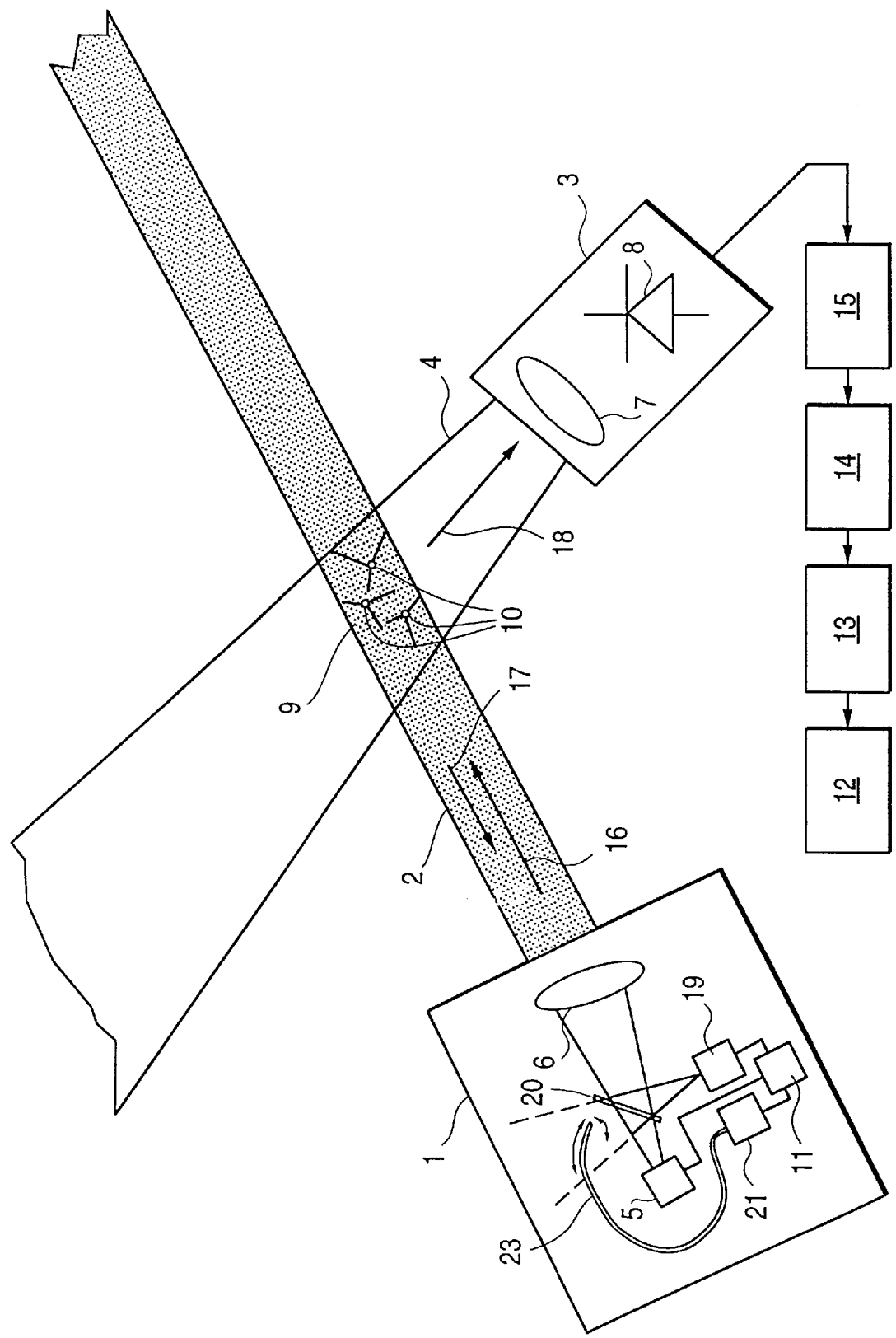

With reference to FIG. 1, the apparatus comprises a light pulse transmitter 1 and an optical receiver 3. The intersection of the transmit beam 2 of the transmitter 1 and the receive beam 4 of the receiver 3 forms a sample volume 9.

The light pulse transmitter 1 typically comprises a light source 5 which may comprise, e.g., a laser diode, combined with optics 6. The optical output power of the transmitter 1 typically is approx. 20 W peak, and the light is emitted as short pulses with a duration of, e.g., 100 ns. The pulse rate is typically in the range 0.3–10 kHz. The light pulse transmitter 5 is combined with an optical receiver 19 which uses the same optics 6 as the transmitter section 5. The transmitter head further includes a data processing unit 11 with a main task to compute the distance of the reflecting front (e.g., fog or cloud) on the basis of the time delay between the transmitted pulse 16 and the return pulse 17.

Correspondingly, the forward scatter receiver 3 includes a receiver optics 7 and a detector section 8 for the measurement of light scattered by and/or reflected from particles 10 contained in the sample volume 9. In block 15 the error component caused by stray light is separated from the detected signal, in block 14 the signal is digitized and stored in memory, in block 13 are performed the computational functions, and the visibility signal obtained from the computation is displayed with the help of block 12.

Figure 4:
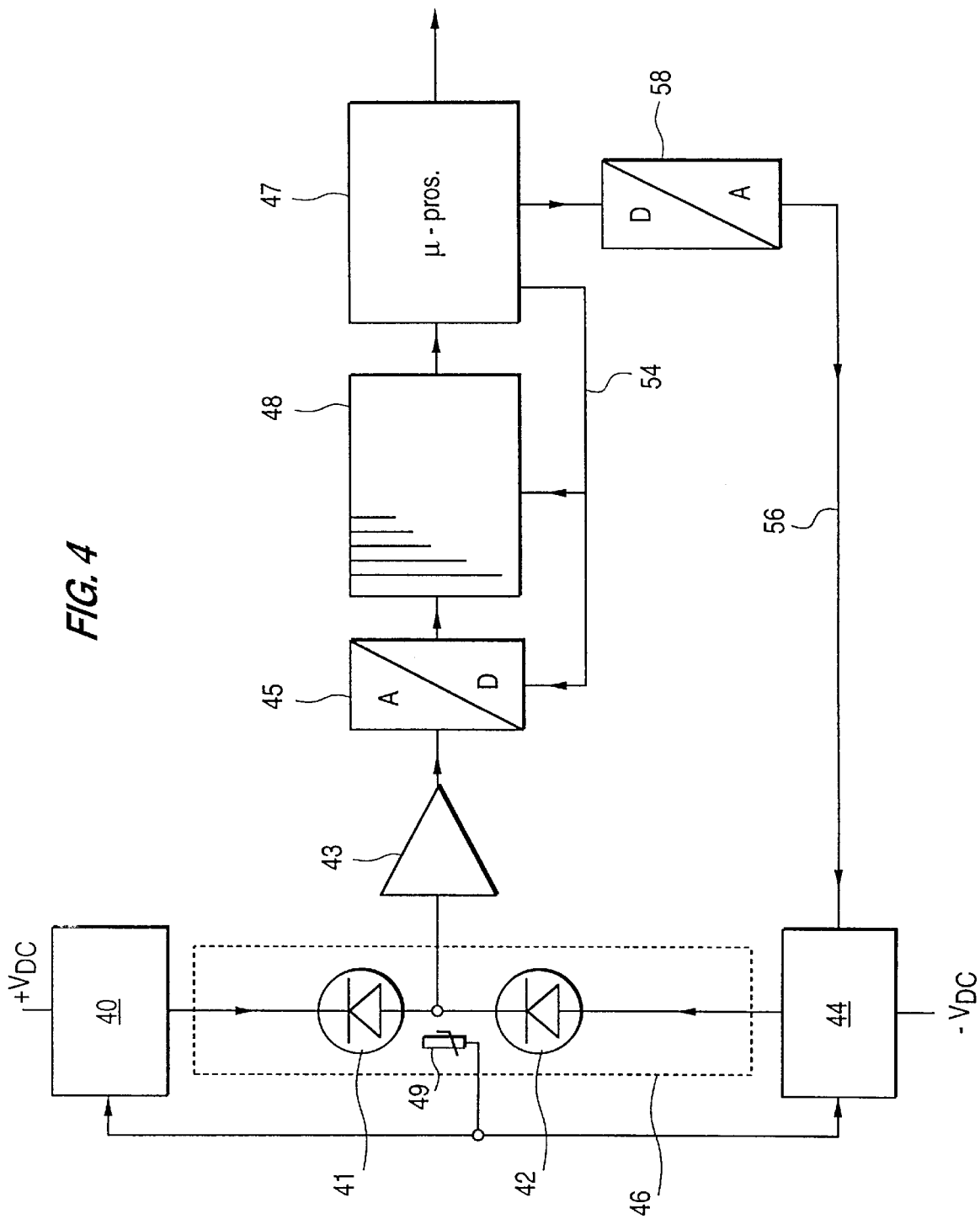
FIG. 4 is a schematic block diagram of the electronic feedback circuitry of the apparatus according to the invention.

The feedback arrangement of the optical signal, shown in detail in FIG. 4, in such a system based on a beam splitter 20 as shown in the diagram is implemented with the help of an optical fiber 23 optically connected to a feedback signal detector 21. The other end of the fiber 23 is placed on the opposite side of the beam splitter 20 relative to the receiver 19. The length of the fiber 23 is advantageously selected so that the delay caused by the fiber is equal to the return delay of the strongest error signal component. If the strongest error signal component is obtained from, e.g., the beam splitter 20, the delay caused by the fiber 23 must be adjusted equal to the optical signal propagation delay between the receiver 19 and the beam splitter 20. By contrast, if the strongest error signal component is related to the focusing lens 6 (or a similar lens group), the delay implemented with the help of the fiber 23 must be set equal to the delay between the lens 6 and the beam splitter 20 multiplied by two. By virtue of the fiber 23, the photodetector elements of receiver 19 and feedback signal detector 21 can be placed physically as close to each other as possible, whereby these elements can be kept under maximally equal ambient conditions. The end of the fiber 23 can be adapted to be movable, whereby the error signal compensation is possible, besides by adjusting the detector bias voltage, as described with relation to FIG. 4, through proper placement of the free end of the fiber 23. In practice, coarse adjustment of compensation occurs by mechanically rotating the fiber end, in the direction of the arrows of FIG. 1 while the fine adjustment is effected electronically such as via the circuit of FIG. 4.

Figure 2:
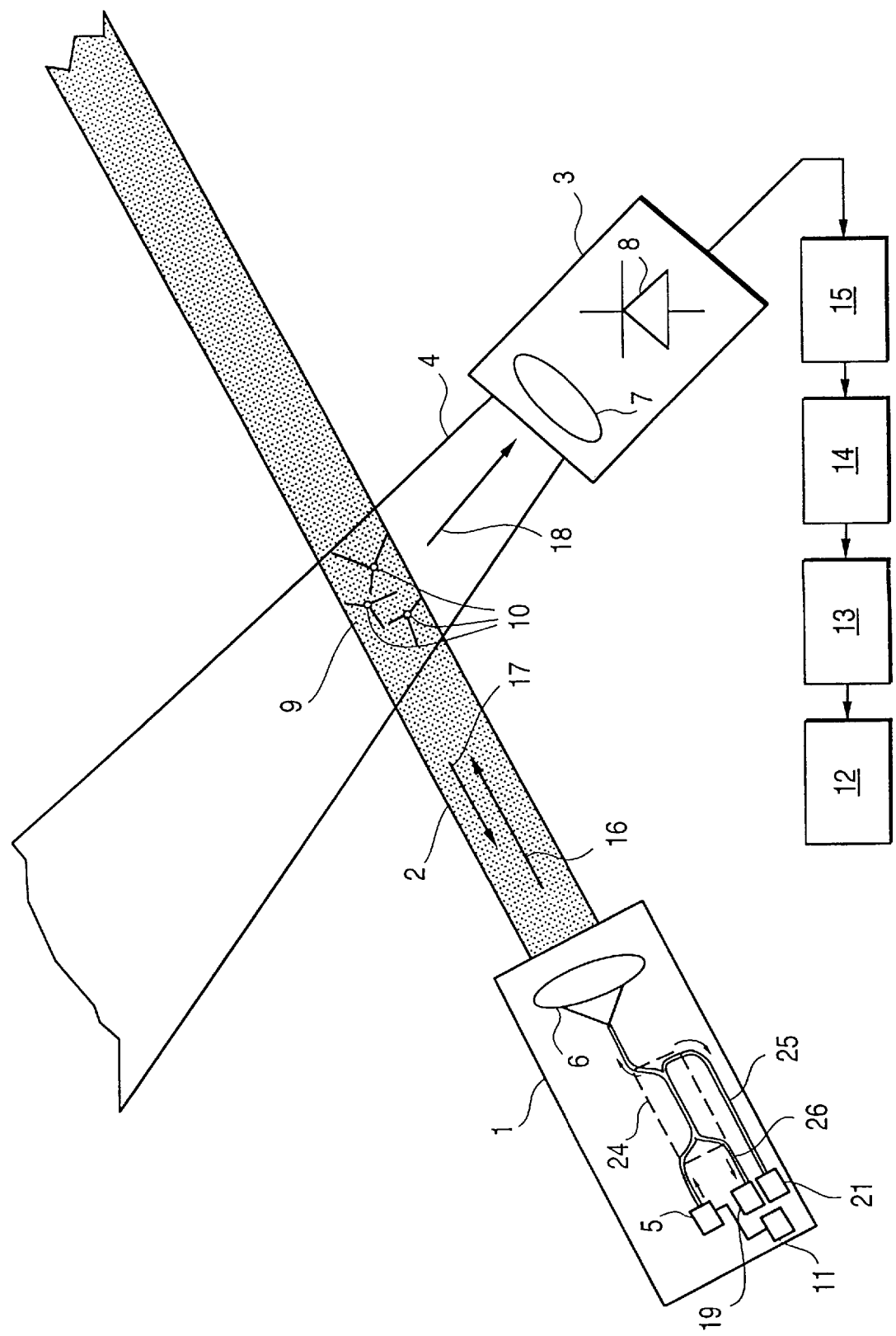
FIG. 2 is a schematic block diagram of an alternative embodiment of the apparatus according to the invention.

With reference to FIG. 2, the feedback signal in a system based on the use of a Y-coupler can be arranged with the help of an optical power splitter 24. The power split ratio can be selected as, e.g., 2:2. To optimize the feedback effect, the signal delay via the optical feedback fiber 25 placed between the optical power splitter 24 and the feedback signal detector 21 is adapted essentially equal to the signal delay via the optical fiber 26 placed between the receiver 19 and the optical power splitter 24.

Figure 3:
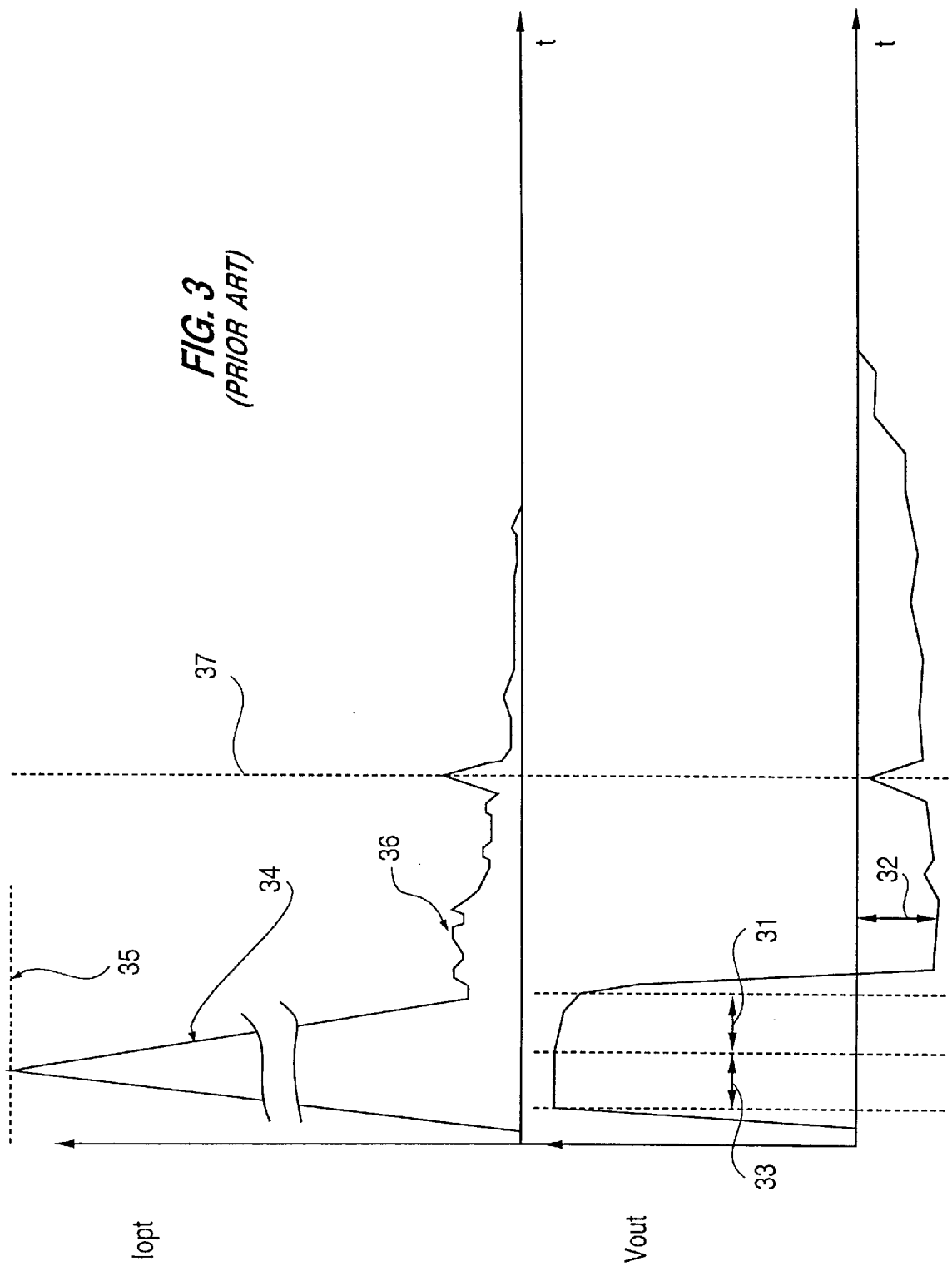
FIG. 3 is a graphic comparison of the input signal of an optically non-feedback-compensated apparatus with the resulting output signal of the detection circuitry.

With reference to FIG. 3, the waveform of the optical input signal to a non-feedback-compensated receiver is shown in the upper graph. As is evident from the graph, the optical leak at the start of the curve causes a transient pulse 34 with a peak intensity 35 of approx. 1,000–1,000,000 times the normal input signal level. In the lower graph depicting the electrical output signal of the receiver, this transient pulse 34 drives the amplifier of the receiver to saturation during the time interval 33. During the time interval 31, the amplifier recovers from this saturation, and due to the overload transient swing 32, any optical signal 36 received as backscatter from fog during this time remains undetected at the amplifier output. A measurement signal from, e.g., a cloud or fixed object can be obtained earliest at time instant 37. This signal may still be corrupted by the overload transient swing 32.

The feedback arrangements described above in relation to FIGS. 1 and 2 may use the feedback circuit of FIG. 4, which controls the sensitivity of photodetectors. Feedback signal detector 42 preferably corresponds to feedback signal detectors 21. Photodetector 41 preferably corresponds to receiver 19.

With reference to FIG. 4, the overload condition of the amplifier can be eliminated by connecting a conventional photodetector element 41 in a half-bridge configuration with the above-described feedback signal detector element 42 (21). In the embodiment illustrated in the diagram, both photodetector elements 41 and 42 are reverse-biased avalanche photodiodes. When the leakage from the strong laser pulse is imposed on both photodiodes 41 and 42 simultaneously, such as when the above-described laser light from light source 5 falls on receiver 19 and feedback signal detector 21, the error signal caused by a huge current pulse through photodetector 41 will be compensated almost entirely by creating a similar current pulse through feedback signal detector 42 so that the amplifier 43 receives the difference between the two currents. The bias voltage of the half-bridge can be fine-adjusted in such a manner that the transient error signal invoked by the optical leakage pulse can be cancelled with the help of the compensating feedback photodiode essentially completely. By virtue of this arrangement, input overload to the amplifier 43 is avoided. The bias voltage can be controlled in a continuous manner by first converting the analog signal into digital form with the help of an A/D converter 45 and then processing this digital signal in a data processing unit 47 (11). The A/D converter 45 typically is a fast, so-called FLASH converter with, e.g., 50 ns sampling interval and 8-bit resolution. The output of the A/D converter 45 is taken to a FIFO (First-In/First-Out) sample buffer 48 prior to being taken to a microprocessor 47. The length of the buffer 48 may be, e.g., 512 samples. The microprocessor 47 controls the sampling operation via a control line 54 taken to both the sample buffer 48 and the A/D converter 45. The bias voltage control is implemented by taking a control signal from the data processing unit 47 to a bias voltage regulator 44 which controls the bias voltage applied over the photodiodes 41 and 42. The bias control can be implemented in a continuous manner as the data processing unit is capable of evaluating the accuracy of the compensation from the measurement signal, and thus can apply a differential increase or decrease to the bias voltage so as to attain complete compensation as the magnitude of the current pulse varies. In practice the bias voltage control circuit is implemented with the help of a constant voltage regulator 40 connected to the positive voltage rail and a controllable voltage regulator 44 connected to the negative voltage rail, whereby the control signal is taken from the microprocessor 47 via a D/A converter 58 along a control line 56 to the latter regulator. The half-bridge 46 is advantageously provided with a temperature sensor circuit 49 connected to said voltage regulators 40 and 44 which helps maintain a constant photodetection sensitivity over a wide temperature range by changing the bias voltage to create an effect equal and opposite to the influence on the circuit elements caused by temperature changes. In fact, the half-bridge 46 formed by the photodiodes 41 and 42 can be considered to form a subtracting circuit in which the amplifier 43 receives a difference between the currents flowing through photodetectors 41 and 42 so that the error signal component is subtracted from the measurement signal.

During rain-free periods, the ceilometer section 1 of the apparatus illustrated in FIG. 1 or FIG. 2 detects and measures cloud base height, and during fog periods, its return signal profile also contains the fog distribution as a function of vertical height. The forward scatter receiver 3 is situated at a height of approx. 1 m from the exit opening of the ceilometer 1 and measures light scatter at a forward angle of 20°–45°, whereby visibility in the sample volume 9 described above can be computed from the receiver output signal by conventional means (blocks 12–15). If and when both measurement functions have been calibrated for exact visibility readings particularly under fog conditions, the visibility readings obtained by both measurement functions of the apparatus will be the same under fog conditions.

During rain, the near-range signal of the ceilometer function will be relatively weaker (representing a relatively better visibility) than the forward scatter signal measured by the forward scatter receiver, as is evident from the discussion above. Thus, this situation is an indication of rain.

During snowing, the near-range signal of the ceilometer function will be relatively stronger (representing a relatively weaker visibility) than the forward scatter signal measured by the forward scatter receiver, as is evident from the discussion above. Thus, this situation is an indication of falling snow.

Detection of blowing snow is also possible by virtue of the present invention, since the return signal profile of the ceilometer function also contains information on the snow distribution as a function of vertical height. If the density profile is found to approach zero at greater heights, obviously the snow is wind-blown.

A local ground fog can be detected by virtue of the apparatus from the situation that the vertical visibility profile in this case indicates a low fog height.

The backward scatter receiver has such a high time resolution on its return signal that individual raindrops or snowflakes can be detected from the signal. In the present invention this property provides redundancy in such a manner that, when the signal is detected to scatter from fog, it is possible to execute quality control by performing a cross-comparison of two different measurement functions, namely, the backward scatter versus the forward scatter, and/or to execute automatic calibration of one of the measurement functions.

The apparatus can be provided with an air temperature sensor, whereby its reliability in the differentiation of rain from snowing is improved.

Further, the apparatus can be provided with a relative humidity sensor, whereby the detection of low-relative-humidity fog (haze in meteorological terminology), sandstorms and other special conditions of present weather characterized by low relative humidity become possible.

Still further, the apparatus can be complemented with a wind velocity meter, whereby the reliability of both blowing snow and local ground fog will be improved to a very high level.

Optionally, the apparatus can be equipped with a simple rain gauge, thus permitting the indication of liquid precipitation rate. This option provides more redundancy and reliability to the measurements.

High transmitter output power is beneficial to the total performance of the apparatus as maximum information on the present weather is then obtained. However, use of a low-power pulsed light transmitter is also feasible within the spirit of the invention, requiring a compromise in the maximum range of the apparatus.

I claim:

1. An apparatus for measuring visibility and present weather, said apparatus comprising:

a light source for transmitting a light ray toward a space to be measured;

a first light detector for measurement of light of the light ray which is forward scattered from elements in said space;

first computing means, connected to said first light detector, for generating a signal representing the detected forward scattered light;

a second light detector for detecting a portion of the light ray retro-reflected directly backward toward said light source due to atmospheric elements, and for generating a signal representing the detected retro-reflected portion of the light ray; and second computing means for receiving the signal from said second light detector and computing the propagation delay between the transmitted light ray and the retro-reflected portion of the light ray in order to determine a distance to the atmospheric elements, said apparatus measuring the present weather based upon said signal generated by said first computing means and the propagation delay computed by said second computing means.

2. An apparatus as defined in claim 1, wherein said light source is a pulsed light transmitter generating a pulsed light ray, said apparatus further including:

feedback elements, operatively associated with said second light detector, for measuring the waveform of the light pulse generated by the transmitter and for generating a first signal;

scaling means for scaling the first signal so as to form a feedback signal adjusted in amplitude and timing based upon the first signal; and subtracting means for subtracting said feedback signal from said first signal so as to adjust the sensitivity of said receiving means thereby avoiding an overload of said receiving means due to excessive intensity of said light pulse.

3. An apparatus as defined in claim 2, wherein said subtracting means comprises a half-bridge formed by measurement and feedback photodiodes and further wherein said scaling means comprises a regulator of the bias voltage of said half-bridge.

4. An apparatus as defined in claim 2, further comprising:

transmitter optics shared by said transmitted pulsed light rays and by said retro-reflected portion of the light rays;

a beam splitter through which said pulsed light rays pass, for allowing said pulsed light rays to reach the space, and for reflecting the retro-reflected portion of the light rays collected by said transmitter optics to the second light detector; and further wherein said feedback elements include an optical fiber placed on the opposite side of the beam splitter relative to the second light detector; and a feedback signal detector connected to said optical fiber for measuring the generated light pulse.

5. An apparatus as defined in claim 2, further comprising:

transmitter optics shared by said transmitted pulsed light rays and by said retro-reflected portion of the light rays;

a Y-coupler for guiding the retro-reflected portion collected by said transmitter optics to said second light detector, and for guiding the generated light pulse to said transmitter optics;

said feedback elements including an optical power splitter operatively connected to said Y-coupler; and a feedback signal detector connected to said optical power splitter for measuring the light pulse generated by said pulsed light transmitter.

6. The apparatus of claim 1, wherein the light ray is directed from said light source along a straight path to the space, and said first light detector is offset from the straight path.

7. A method of measuring present weather, said method comprising the steps of:

generating light pulses;

impinging the light pulses on a space to be measured;

receiving and measuring light of the light pulses which is forward-scattered from elements in the space to be measured;

receiving backward directed portions of the light pulses which are directed backward due to atmospheric elements, and generating a signal representing the detected backward directed portions;

computing the backward propagation delays of the backward directed portions of the pulsed light based upon the signal; and determining present weather based upon the measured light of the light pulses which is forward-scattered, and the signal representing the detected backward directed portions of the light pulses.

8. A method as defined in claim 7, further including the steps of:

measuring the generated light pulse such that stray light is excluded, and producing a measurement signal;

generating a feedback signal based on the measurement signal; and subtracting said feedback signal from said measurement signal in order to adjust the measurement signal based upon an intensity of said light pulse.

9. A method as defined in claim 8, further including the step of:

scaling the detected shape of the light pulse in a half-bridge circuit configuration comprising avalanche photodiodes whose bias voltage is controlled in order to scale the feedback signal amplitude.

10. A method as defined in claim 7, further including the steps of:

guiding the received backward directed portions of the light pulses to a receiver via a beam splitter;

measuring the generated light pulse with the help of an optical fiber placed on the opposite side of the beam splitter relative to the receiver, and a feedback signal detector connected to the optical fiber.

11. A method as defined in claim 7, further comprising the step of:

guiding the received backward directed portions of the light pulses to a receiver via a beam fiber-optical Y-coupler;

measuring the generated light pulse with the help of an optical power splitter formed in said Y-coupler, and a feedback signal detector connected to an output of the power splitter.

12. An apparatus for measuring visibility and present weather, said apparatus comprising:

a light source for generating a light beam, the light beam being directed along a light path toward the open atmosphere;

a first light detector for detecting light from the light beam which is retro-reflected along the light path due to atmospheric elements in the open atmosphere, and for producing a first detection signal;

a second light detector for detecting light from the light beam which is forward scattered due to objects which are in the open atmosphere and within the light path, and for producing a second detection signal; and computing means for measuring visibility and present weather based upon the first and second detection signals, wherein said computing means computes a propagation delay between the generated light beam and the retro-reflected light detected by said first light detector, the propagation delay being used by said computing means to measure the present weather.

13. The apparatus of claim 12, further comprising:

an optical fiber for receiving the light generated by said light source and directing the received light to a signal detector of said computing means.

14. The apparatus of claim 13, further comprising:

a beam splitter in the light path, said beam splitter permitting the light generated by said light source to be directed to the light path and to the optical fiber, and permitting the retro-reflected light to be directed to the light receiver.

15. The apparatus of claim 13, wherein said optical fiber connects to an optical splitter, whereby the light beam received by said optical fiber is directed to the light path via said optical fiber.

16. The apparatus of claim 13, wherein said optical fiber connects to an optical splitter, and wherein said optical fiber receives the retro-reflected light from the light path and supplies the received retro-reflected light to said light receiver.

17. The apparatus of claim 12, said first light detector including:

a light sensor for producing the first detection signal;

an adjustable bias voltage source for supplying an adjustable bias voltage to said light sensor; and a feedback circuit, operatively connected to said light sensor, for adjusting the adjustable bias voltage based upon the first detection signal.

18. The apparatus of claim 17, wherein said feedback circuit includes:

an analog-to-digital converter for digitizing the first detection signal;

a processor for producing a digital control signal based upon the digitized first detection signal; and a digital-to-analog converter for converting the digital control signal to analog form, and for supplying the analog control signal to said adjustable bias voltage source so as to adjust the adjustable bias voltage.

19. The apparatus of claim 17, wherein said light sensor includes two photodiodes connected between a first voltage source and said adjustable bias voltage source, said two photodiodes being series connected with a node therebetween, the first detection signal being produced at the node.

20. The apparatus of claim 12, wherein the computed propagation delay is used to determine altitude of clouds.

* * * * *